(12) United States Patent
Glasgow et al.

(10) Patent No.: US 10,948,335 B2
(45) Date of Patent: Mar. 16, 2021

(54) LIQUID VOLUMETRIC MEASUREMENT DEVICE

(71) Applicant: Forward Biotech, Inc., Averill Park, NY (US)

(72) Inventors: Ian K. Glasgow, Averill Park, NY (US); Jiangbo Tang, Albany, NY (US); Cailee Dean, Southampton, MA (US)

(73) Assignee: Forward Biotech, Inc., Troy, NY (US)

( * ) Notice: Subject to any disclaimer, the term of this patent is extended or adjusted under 35 U.S.C. 154(b) by 297 days.

(21) Appl. No.: 16/146,021

(22) Filed: Sep. 28, 2018

(65) Prior Publication Data

US 2019/0033120 A1 Jan. 31, 2019

Related U.S. Application Data

(63) Continuation of application No. PCT/US2017/025061, filed on Mar. 30, 2017.
(Continued)

(51) Int. Cl.
*G01F 25/00* (2006.01)
*B01L 3/02* (2006.01)
(Continued)

(52) U.S. Cl.
CPC ........ *G01F 25/0092* (2013.01); *B01L 3/0213* (2013.01); *B01L 3/502* (2013.01);
(Continued)

(58) Field of Classification Search
CPC .. G01F 25/0092; G01F 25/0084; G01F 13/00; G01F 22/00; G01F 19/00;
(Continued)

(56) References Cited

U.S. PATENT DOCUMENTS 4,178,345 A 12/1979 Terk
D298,967 S 12/1988 Hunt
(Continued)

FOREIGN PATENT DOCUMENTS

WO 2015-099532 A1 7/2015

OTHER PUBLICATIONS

Kim, Y., International Application No. PCT/US2017/025061, International Search Report and Written Opinion, dated Jun. 19, 2017, 14 pages.
(Continued)

*Primary Examiner* — Eric S. McCall
*Assistant Examiner* — Timothy P Graves
(74) *Attorney, Agent, or Firm* — LaBatt, LLC

(57) ABSTRACT

A cartridge for evaluating the volume of an aliquot of liquid is described. The cartridge can have one or more well tabs that pivot into a position in which liquid dispensed into a corresponding well is placed in contact with a capillary and surface tension draws the liquid from the well into the capillary. Comparison of the liquid-air interface with markings on or near the capillary, can reveal the volume of liquid dispensed. One or more additional features, such as well tabs that are stable in a substantially vertical orientation and/or a groove for protecting and/or self-aligning the capillary can ensure that the device operates properly.

20 Claims, 12 Drawing Sheets

Related U.S. Application Data

(60) Provisional application No. 62/317,871, filed on Apr. 4, 2016, provisional application No. 62/435,892, filed on Dec. 19, 2016.

(51) Int. Cl.
  *B01L 9/00* (2006.01)
  *G01F 19/00* (2006.01)
  *B01L 3/00* (2006.01)
  *G06T 7/62* (2017.01)
  *H04N 7/18* (2006.01)

(52) U.S. Cl.
  CPC ............... *B01L 9/54* (2013.01); *G01F 19/00* (2013.01); *G01F 25/0084* (2013.01); *B01L 2200/025* (2013.01); *B01L 2200/026* (2013.01); *B01L 2200/143* (2013.01); *B01L 2200/148* (2013.01); *B01L 2300/028* (2013.01); *B01L 2300/0838* (2013.01); *B01L 2300/161* (2013.01); *B01L 2400/0406* (2013.01); *G06T 7/62* (2017.01); *H04N 7/185* (2013.01)

(58) Field of Classification Search
  CPC .. B01L 2200/148; B01L 3/021; B01L 3/5027; B01L 2300/0838; B01L 2200/026; B01L 9/54; B01L 3/5085
  See application file for complete search history.

(56) References Cited

U.S. PATENT DOCUMENTS

| | | | |
|---|---|---|---|
| D341,663 S | 11/1993 | Coulter | |
| D360,031 S | 7/1995 | Davis | |
| D369,868 S | 5/1996 | Nazareth et al. | |
| 5,518,006 A | 5/1996 | Mawhirt et al. | |
| D375,450 S | 11/1996 | Bidwell et al. | |
| D383,852 S | 9/1997 | Shartle et al. | |
| D435,665 S | 12/2000 | Ogle | |
| D455,493 S | 4/2002 | Crawford et al. | |
| D531,321 S | 10/2006 | Godfrey et al. | |
| D547,863 S | 7/2007 | Heinsch | |
| D610,698 S | 2/2010 | Laudo et al. | |
| D634,853 S | 3/2011 | Ramsamy | |
| D645,950 S | 9/2011 | Kenyon et al. | |
| D664,262 S | 7/2012 | Khan | |
| D669,582 S | 10/2012 | Weston et al. | |
| D672,042 S | 12/2012 | Delaey | |
| D674,506 S | 1/2013 | LaBrasca | |
| D681,690 S | 5/2013 | Xia et al. | |
| D695,906 S | 12/2013 | Okuda | |
| D724,754 S | 3/2015 | Kuroda et al. | |
| D773,070 S | 11/2016 | Porreca et al. | |
| D797,285 S | 9/2017 | Martin et al. | |
| D813,241 S | 3/2018 | Wengreen | |
| D831,209 S | 10/2018 | Huitema et al. | |
| D834,721 S | 11/2018 | Klein et al. | |
| D836,198 S | 12/2018 | Harris et al. | |
| D837,998 S | 1/2019 | Schaff et al. | |
| D840,051 S | 2/2019 | Schulz et al. | |
| 2003/0107738 A1 | 6/2003 | Curtis | |
| 2008/0066523 A1 | 3/2008 | Schmid et al. | |
| 2011/0056287 A1 | 3/2011 | Schardt et al. | |
| 2014/0150522 A1* | 6/2014 | Glasgow | G01F 17/00 73/1.74 |
| 2014/0267695 A1* | 9/2014 | Scordato | G01F 22/00 348/135 |

OTHER PUBLICATIONS

Application No. EP 17728037, Supplementary European Search Report, dated Jun. 15, 2018, 2 pages.
Goodman, M., Application No. 17728037.7, Office Action 1, dated Apr. 8, 2019, 3 pages.

* cited by examiner

LIQUID VOLUMETRIC MEASUREMENT DEVICE

REFERENCE TO RELATED APPLICATIONS

The current application is a continuation of International Application No. PCT/US2017/025061, filed 30 Mar. 2017, which claims the benefit of U.S. Provisional Application No. 62/317,871, filed on 4 Apr. 2016, and U.S. Provisional Application No. 62/435,892 filed on 19 Dec. 2016, each of which is hereby incorporated by reference.

TECHNICAL FIELD

The disclosure relates generally to measuring a volume of liquid, and more particularly, to an aid for calibration or evaluation of a liquid dispensing device.

BACKGROUND ART

Pipettes and robotic liquid transfer systems are crucial to the life sciences. The liquids, which may be samples, reagents, buffers, chemicals, or other liquids, must be mixed in precise ratios for sample preparation or analysis, or for desired end products. The accuracy of the experiment or the quality of the data or products is dependent upon the precision of the liquid transfer volumes.

There is a need for evaluating the volumes of liquids dispensed by the pipettes and robotic liquid transfer systems. For that reason, many laboratories insist upon periodic calibration of the pipettes and robotic liquid transfer systems. Calibration is a tedious process and the pipettes or robotic systems cannot be used for their intended purpose during the calibration process. In most cases, the pipettes have to be sent to a calibration service, and they are not available for use for two or more days.

SUMMARY OF THE INVENTION

If a quick and simple method were available, scientists could check their pipettes and robotic devices on a more frequent basis or whenever they had doubts regarding whether their pipettes or robots were dispensing volumes within acceptable tolerances.

Aspects of the invention provide features for a device for a quick determination of a volume of liquid dispensed. Features described herein can make the device durable, practical, and ergonomic.

In an illustrative embodiment, a device for determining the volume of a dispensed liquid is described. The device can include at least one capillary and a well for the dispensed liquid. The device can be used to evaluate the accuracy of pipettes and other liquid dispensing devices. In an embodiment, a cartridge can have one or more well tabs that pivot into a position in which liquid dispensed into a corresponding well is placed in contact with a capillary and surface tension draws the liquid from the well into the capillary. Comparison of the liquid-air interface with markings on or near the capillary, can reveal the volume of liquid dispensed. One or more additional features, such as well tabs that are stable in a substantially vertical orientation and/or a groove for protecting and/or self-aligning the capillary can ensure that the device operates properly.

A first aspect of the invention provides a device comprising: a capillary; a cartridge body having a top surface including means for positioning and affixing the capillary to the cartridge body such that a proximal end of the capillary is located adjacent to a first end of the cartridge body, wherein at least one of: the top surface of the cartridge body or a protrusion located on the top surface of the cartridge body extends above the capillary; a well tab, wherein the well tab includes a well for holding a volume of fluid; means for pivotally mounting the well tab to the first end of the cartridge body, wherein the means for pivotally mounting enables the well to have a substantially horizontal orientation and a substantially vertical orientation, and wherein the well is located adjacent to an end of one of the capillary when the well tab is in the substantially vertical orientation to allow liquid in the well to wick into the capillary.

A second aspect of the invention provides a measurement system comprising: a cartridge body; a capillary mounted to a top surface of the cartridge body, wherein at least one of: the top surface of the cartridge body or a protrusion located on the top surface of the cartridge body extends above each of the plurality of capillaries; a well tab, wherein the well tab includes only one well for holding a volume of fluid, wherein the cartridge body has a color near the capillary configured to provide a sharp contrast to a color of the volume of fluid; means for pivotally mounting the well tab to the cartridge body, wherein the means for pivotally mounting enables the well tab to have a substantially horizontal orientation and a substantially vertical orientation, wherein the means for pivotally mounting includes means for stabilizing the well tab in the substantially vertical orientation, and wherein the well is located adjacent to an end of the capillary when the well tab is in the substantially vertical orientation to allow liquid in the well to wick into the capillary.

A third aspect of the invention provides a measurement system comprising: a cartridge body having a first end wider than a second end located opposite the first end; a plurality of capillaries mounted to the cartridge body, each of the plurality of capillaries having an end located at the first end of the cartridge body, wherein at least one of: a top surface of the cartridge body or a protrusion located on the top surface of the cartridge body extends above each of the plurality of capillaries; a set of well tabs including a plurality of wells, wherein each of the plurality of wells is aligned with one of the plurality of capillaries, wherein each of the plurality of wells is configured to hold a unique volume of fluid; and means for pivotally mounting the set of well tabs to the cartridge body, wherein the means for pivotally mounting each well tab in the set of well tabs allows at least one of the plurality of wells to be pivoted between a substantially horizontal orientation and a substantially vertical orientation, wherein the at least one of the plurality of wells is located adjacent to an end of one of the plurality of capillaries in the substantially vertical orientation to allow liquid in the well to wick into the capillary.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

Figure 1:
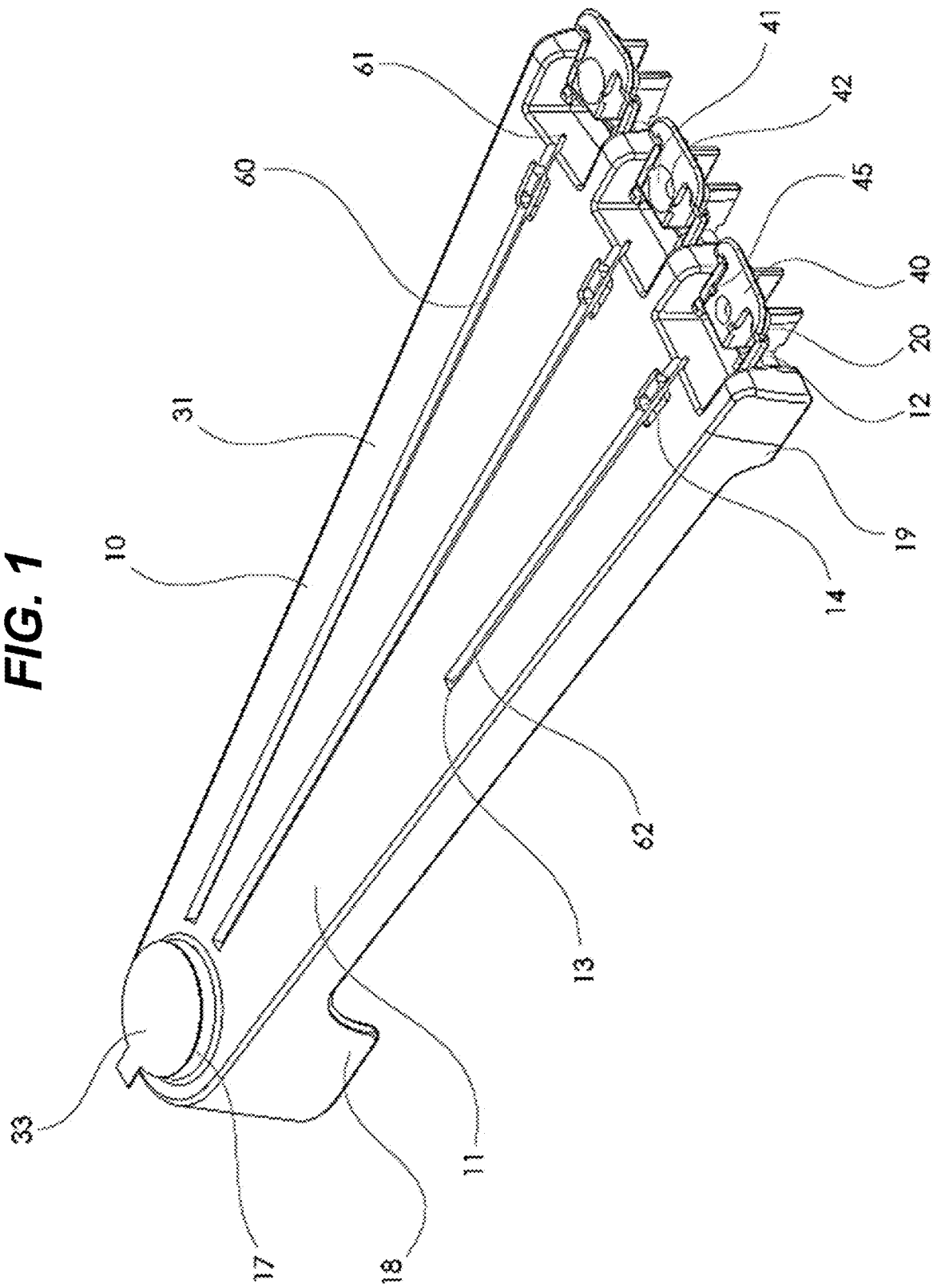
FIG. 1 shows a cartridge with three separate well tabs, each able to pivot independently, according to an embodiment.

It is noted that the drawings may not be to scale. The drawings are intended to depict only typical aspects of the invention, and therefore should not be considered as limiting the scope of the invention. In the drawings, like numbering represents like elements between the drawings, however, not all reference numbers are included in each drawing for clarity.

DETAILED DESCRIPTION OF THE INVENTION

As indicated above, aspects of the invention provide a device for determining the volume of a dispensed liquid. The device can include at least one capillary and a well for the dispensed liquid. The device can be used to evaluate the accuracy of pipettes and other liquid dispensing devices. In an embodiment, a cartridge can have one or more well tabs that pivot into a position in which liquid dispensed into a corresponding well is placed in contact with a capillary and surface tension draws the liquid from the well into the capillary. Comparison of the liquid-air interface with markings on or near the capillary, can reveal the volume of liquid dispensed. Well tabs that are stable in the fully open or fully closed positions and/or a groove for protecting and self-aligning the capillary can ensure that the device operates properly.

Embodiments of a cartridge described herein can provide a more durable and/or ergonomic device for determining the volume of an aliquot of liquid. Such a cartridge can be used to evaluate the accuracy of a pipettor or other liquid dispensing device.

Figure 2:
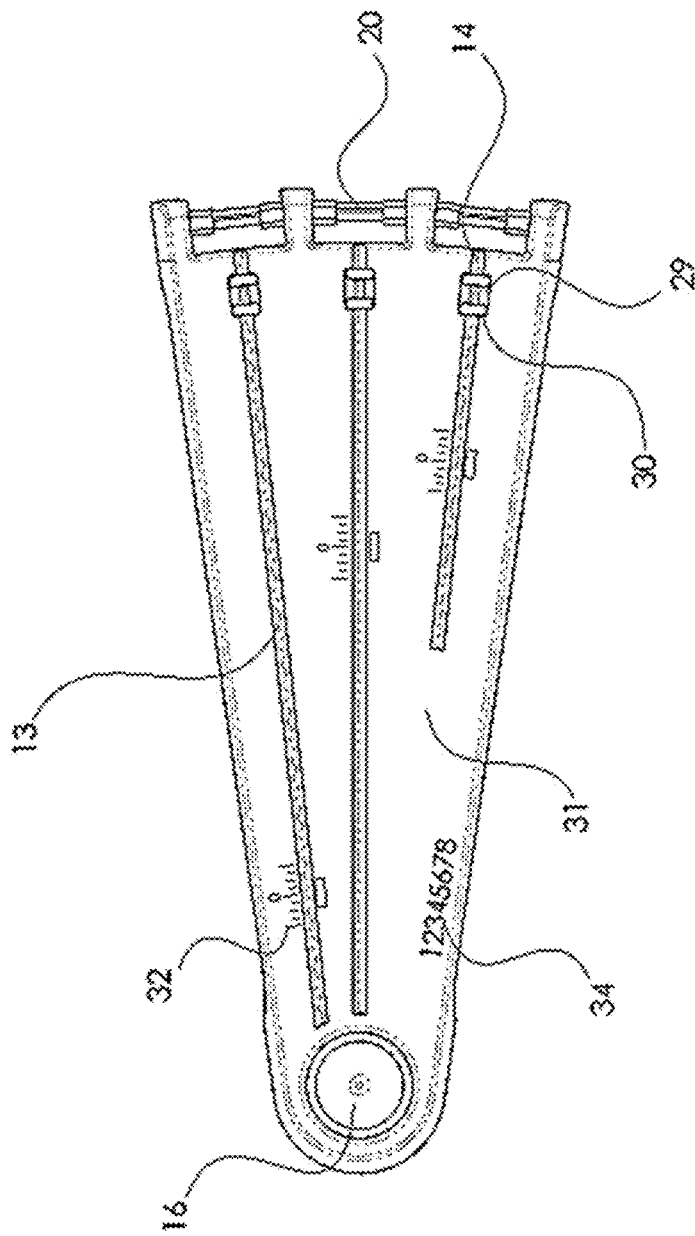
FIG. 2 shows a top view of the cartridge body of FIG. 1.
Figure 3A:
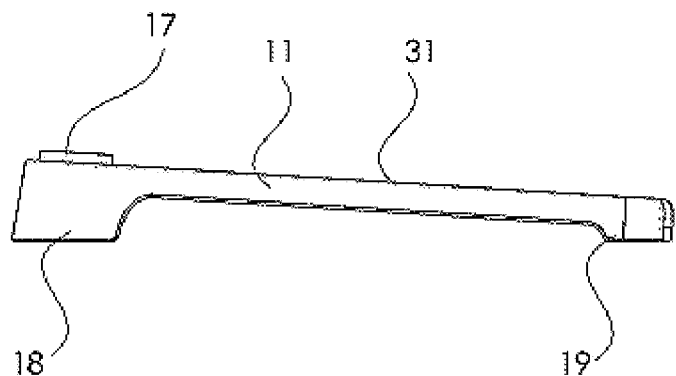
FIGS. 3A and 3B show side views of the cartridge body of FIG. 1 and an alternative embodiment of the cartridge body.
Figure 3B:
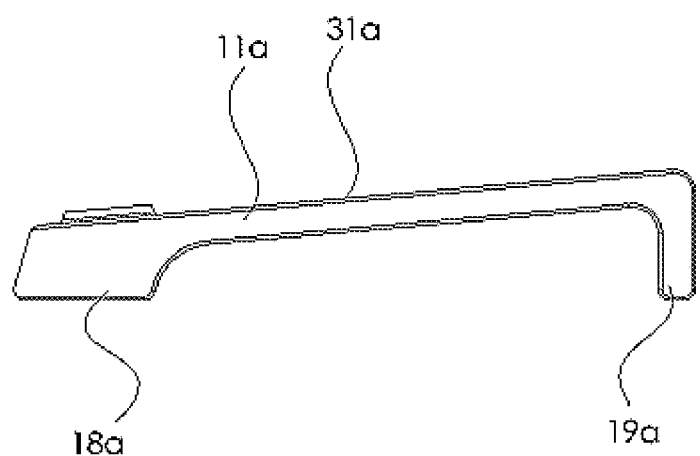
Figure 4:
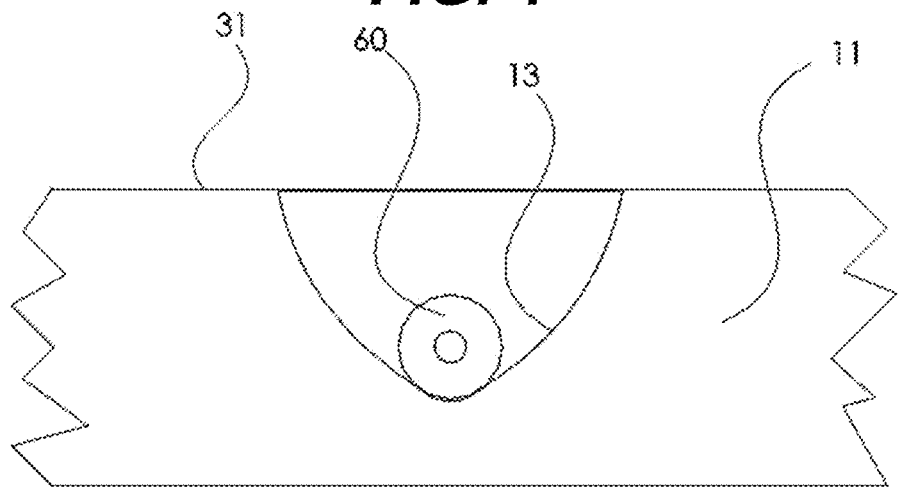
FIG. 4 shows an end view of a groove with a capillary in place according to an embodiment.

Turning to the drawings, FIG. 1 shows an illustrative cartridge 10, which includes a cartridge body 11 with a top surface 31 configured to position and affix capillaries 60 thereto according to an embodiment. FIG. 2 shows a top view of the cartridge body 11, while FIGS. 3A and 3B show side views of the cartridge body 11 and an alternative embodiment of the cartridge body 11a. FIG. 4 shows an end view of a groove 13 with a capillary 60 in place according to an embodiment.

Referring to FIGS. 1 to 4, the top surface 31 of the cartridge body 11 is shown including three grooves 13 (e.g., V-grooves). Each groove 13 can be configured to retain a capillary 60, and has a proximal end 14 located at an end of the cartridge body 11 at a location for a well tab 40. The grooves 13 extend in length along the top surface 31 of the cartridge body 11 to be of a length on a scale of a length of the corresponding capillary 60 each holds, however the grooves 13 can extend beyond the distal end 62 of each capillary 60. A recess or capillary attachment region 29 bordered by two slots 30 can be located along the groove 13, e.g., near the proximal end 14.

The cartridge body 11 can include two proximal or front feet or legs 19 and one rear or distal leg or foot 18, all extending downward from the cartridge body 11. The cartridge body 11 can narrow from front to rear, e.g., to make it easier for a user to hold the cartridge 10 in place using a thumb and index finger to grip the rear end of the cartridge body 11. In an embodiment, the cartridge body 11 can be configured to hold the capillary(ies) 60 at an incline. The relative heights of the front and rear legs of the cartridges described herein define the angle of inclination of the capillaries. To this extent, as shown in FIG. 3A, the distal or rear foot 18 can be taller than the proximal or front feet 19, to cause the top surface 31 and the grooves 13 to be at a small incline of about 3½ degrees.

However, it is understood that the incline can be in a direction away from the well tab 40 or towards the well tab 40. To this extent, FIG. 3B shows an alternative embodiment of an illustrative cartridge body 11a configured to hold capillary(ies) at an incline away from the well tab 40. In particular, the cartridge body 11a has front feet 19a which are longer than the rear foot 18a. This causes the top surface 31a and capillary(ies) secured to the cartridge body 11a, to be inclined away from the wells (located near the front feet 19a). For example, the incline can be about 3½ degrees.

In an embodiment, the grooves 13 have a V-shape so that when the capillary 60 is tangent to both walls of the groove 13, the capillary 60 is centered, as most clearly illustrated in FIG. 4, for example. The grooves 13 can be deep enough that the capillaries 60 lie below a top surface 31 of the cartridge 10, which can provide protection for the capillaries. A surface (e.g., material) of a groove 13 can have a color (e.g., white) which provides a background for viewing a meniscus once a dye wicks into the capillary 60 as discussed herein.

Three capillaries 60, each of which can be composed of glass, are shown affixed to the grooves 13. Each capillary 60 has a proximal end 61 near the well tab 40. The other end of each capillary is the distal end 62. The three capillaries 60 can be of the same or different size and geometry. In an embodiment, the three capillaries 60 can be utilized to test the top, middle, and bottom of a range of an adjustable pipettor. Regardless, the geometry of each groove 13 can be configured to cause the capillary 60 to be centered, and its position well defined. Each capillary 60 can be adhered to the groove 13 using any solution (e.g., an adhesive). The slot 30 of each groove 13 can function as a barrier to wicking of an adhesive along the capillary-groove interface, e.g., before the adhesive cures, thereby preventing the adhesive from spreading beyond the attachment region.

The top surface 31 of the cartridge 10 can include markings 32, e.g., graduations and rectangular boxes, which can be utilized in measuring the liquid as described herein. The cartridge 10 can include additional markings or a label to indicate, for example, a serial number, a cartridge ID, a lot number, a model number, and/or the like. For example, a cartridge ID 34 is shown marked on the top surface 31.

An embodiment of the cartridge body 11 includes a raised lip 17 along the perimeter of a recess or cup or reservoir 16. A membrane or plenum or foil seal 33 can be attached to the raised lip 17, covering the reservoir 16. For example, the foil seal 33 can be induction sealed to the raised lip 17. However, it is understood that the reservoir 16 can be sealed by other methods, such as by an adhesive backed foil. Similarly, it is understood that embodiments of the cartridge can be implemented without a reservoir. In an embodiment, a colored liquid or dye (e.g., a red dye), which can be blocked from view by the foil seal 33, is located in the reservoir 16.

Figure 5:
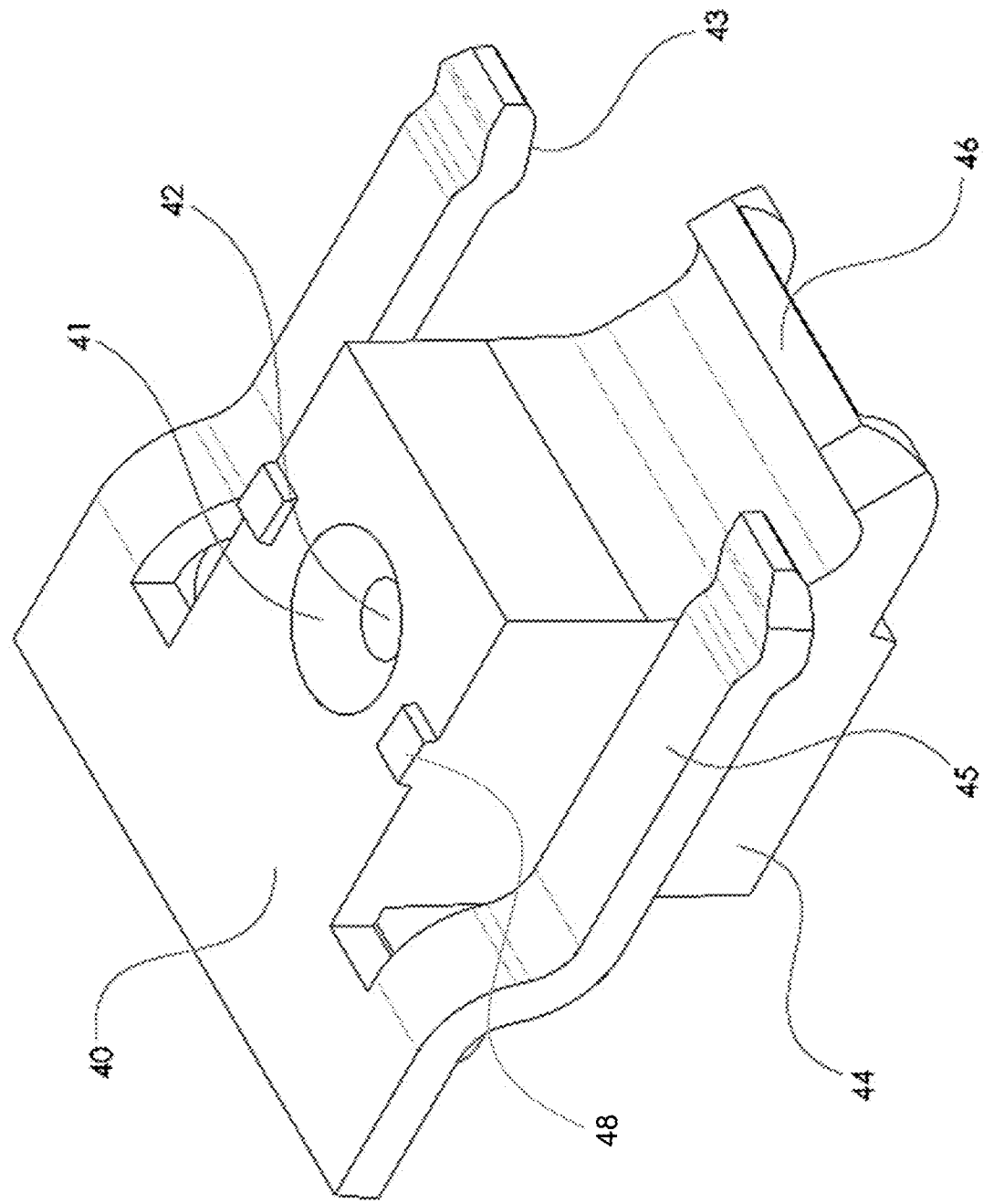
FIG. 5 shows an individual well tab according to an embodiment.

As shown in FIG. 1, well tabs 40 can be pivotally attached to the cartridge body 11 at a location corresponding to the proximal end 14 of each groove 13 and a proximal end 61 of a corresponding capillary 60. In an embodiment, the cartridge body 11 includes three axles 20 and six cams 12, to which the three well tabs 40 are attached. FIG. 5 shows an individual well tab 40 according to an embodiment, while FIG. 6 shows a cross section of the individual well tab 40.

Figure 6:
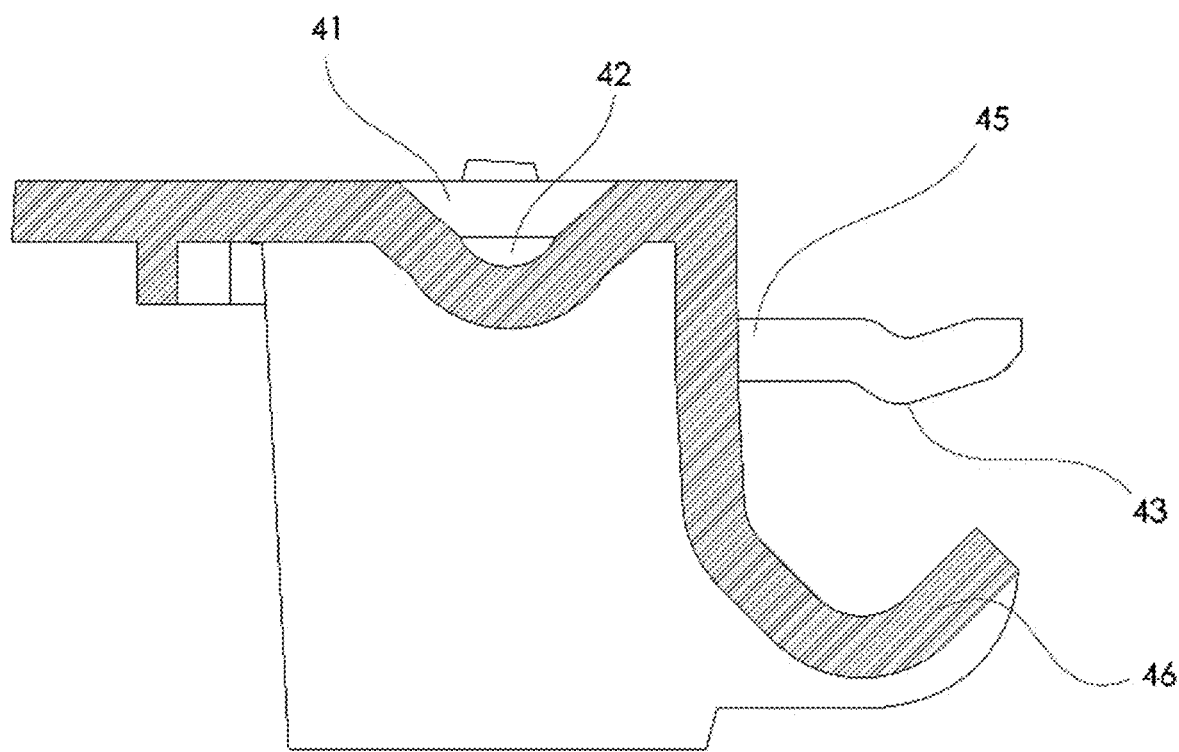
FIG. 6 is a cross section of the individual well tab of FIG. 5.

Referring to FIGS. 1 and 5-6, each well tab 40 has a recess or well 41. The well 41 in the well tab can be formed of a hydrophobic material and have a smooth surface. The well 41 can be sized for the capillary 60, e.g., the well 41 and the capillary 60 can be configured to contain approximately the same amount of liquid. Two of the three wells 41 shown in FIG. 1 have a secondary well, small depression, small recess, detent, or divot 42 located (e.g., centered) at the bottom of the well 41. The divot 42 can be sized to enable the tip of a small pipette to fit in the divot. The three well tabs 40 and/or the corresponding wells 41 can have the same or different sizes and geometries. The well tabs 40 can be configured to pivot such that the proximal end 61 of each capillary 60 can be almost in contact with a well 41 of a well tab 40.

Figure 7:
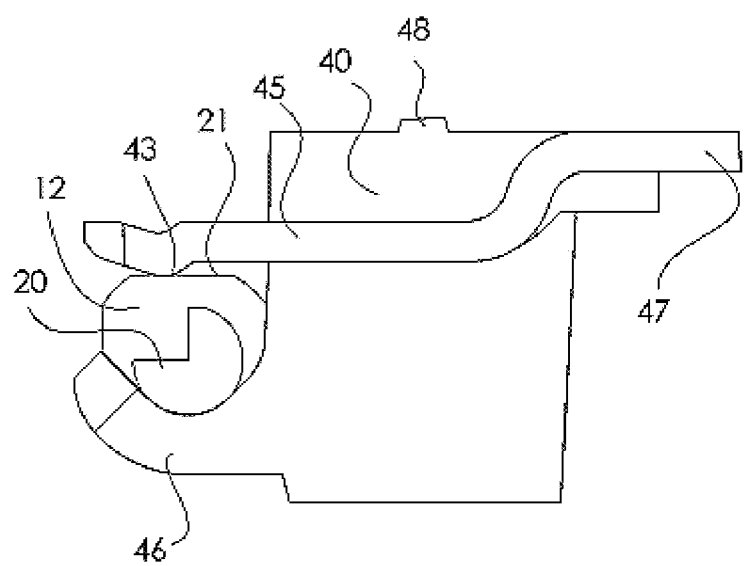
FIG. 7 shows an illustrative cross section of a well tab and a pivot region of the cartridge according to an embodiment.

To this extent, FIG. 7 shows an illustrative cross section of a well tab 40 and a pivot region of the cartridge according to an embodiment. Referring to FIGS. 5-7, each well tab 40 can have two flexible arms or beams or cam followers 45. The flexible arms 45 and the cams 12 can be configured to encourage the well tabs 40 to be in either a down or horizontal state or in an up or near vertical orientation, applying a small force or torque to force the well tabs 40 against a mechanical stop, to define the well tab's position. Each well tab has a V-groove or pivot block 46, which can contact the axle 20 and define a position of the well tab, ensuring that as the well tab rotates, the well aligns with the proximal end of the capillary. In an embodiment, the pivot block 46 has a width that substantially corresponds to the length of the axle 20 between the cams 12.

The flexible arms 45 and the pivot block 46 can be designed to fit around the axle 20 and the cams 12 of the cartridge (FIG. 2), thus defining the range of positions of the well tab 40. A contact region 43 can be located on the underside of each of the flexible arms 45. The contact region 43 on the flexible arm 45 can comprise a rounded section protruding from the bottom surface, located to contact the cam 12. Additionally, a well tab 40 can include support ribs 44, which can be shaped to limit the rotational travel of the well tab 40 in the direction away from the capillary, to a horizontal position. The support ribs 44 also can provide stiffness and strength, e.g., so that the well tabs 40 are adequately supported when a downward force is applied to the well tabs 40, such as when the user is dispensing liquids into the wells 41 using a pipette. The well tab 40 can include protrusions 48 to limit the rotational travel toward the capillary to an almost vertical position, in which the well 41 almost contacts the entrance of the capillary 60 (FIG. 1).

As shown in FIG. 7, the contact region 43 of the flexible arm 45 of the pivot block can contact a cam 12 attached to the cartridge body. The contact region 43 can rest on a flat 21 on the cam 12, defining a stable rotational position. The cam 12 can include two flats 21, each of which corresponds to the well tab 40 in horizontal and near vertical positions. The flats 21 can be at angles that lead to a light force holding the well tab in the corresponding horizontal and near vertical positions. The well tab 40 can include a clearance under the end 47 of the well tab 40, so that a finger can apply a light upward force and rotate the well tab 40 from the horizontal to the near vertical position, or vice versa.

Figure 8:
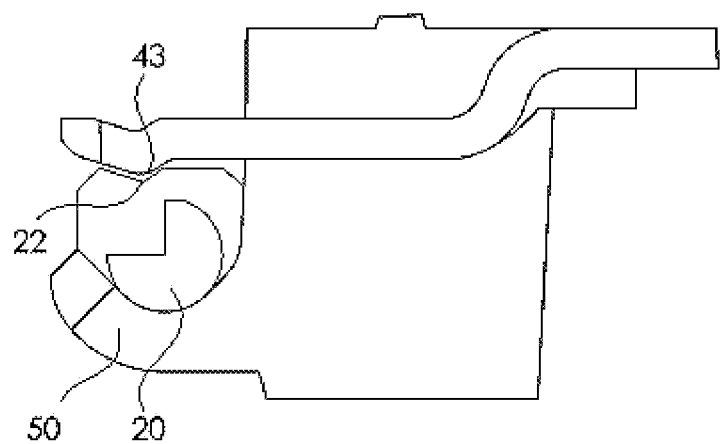
FIG. 8 shows an illustrative cross section of a well tab and a pivot region of the cartridge according to another embodiment.

FIG. 8 shows an illustrative cross section of a well tab and a pivot region of the cartridge according to another embodiment. In this case, the cam 12 includes a detent 22 or recess, which can be sized such that the contact region 43 of the flexible arm 45 will snugly fit in the detent 22, providing more positional stability than the flats shown in FIG. 7. This figure also shows an embodiment of a pivot block with a curved shaped or circular block 50 that mates closely with the axle 20.

Referring to FIGS. 1-6, in an illustrative application, a user can evaluate the accuracy of a pipette using the cartridge 10. For example, with the well tabs 40 in a horizontal position, the user can dispense a volume of a liquids, such as an aqueous dye (e.g., obtained from the reservoir 16), into a well 41 using the pipette. As described herein, the cartridge can be configured to measure three different dispensed volumes, so the user can dispense the corresponding different volumes into each well 41. Each well 41 can be shaped to enable the user to easily position the pipette tip in the center of the well 41 so that the liquid is dispensed in the center of the well 41.

A well 41 intended for a very small volume, such as 1 microliter or less, can have a divot 42 at the bottom. The divot 42 can serve to help position the pipette tip and also retain the liquid in the center of the well 41 when the user removes the pipette tip from the well 41. Without the divot 42, a pipette tip may nudge the dispensed liquid away from the center of the well. If the liquid is not in the center of the well, it may not align properly to the corresponding capillary and thus not wick into the capillary. Markings near and/or other features of the wells 41 can assist the user in determining which well 41 should receive a corresponding target volume of liquid.

After dispensing the volume of liquid, the user can use a finger to rotate the well tab 40 about the axle 20, from the horizontal position to a near vertical position. In this position, the liquid in the well 41 is now in contact with the corresponding capillary 60. Surface forces wick the liquid into the glass (e.g., hydrophilic) capillary 60. The capillary 60 can be at a slight incline so that due to gravity, the slug of liquid fills the capillary 60 from the proximal or entrance end 61 to a region with the markings 32. The markings 32 enable the user to determine the volume of liquid in the capillary 60. The markings 32 may delineate volumes, percentages of difference from a target volume, volume differences from a target volume, or acceptable tolerance bands for the target volume, such as the allowed tolerances for dispensed liquids per a standard, such as ISO 8655.

Alternatively, when the capillaries are inclined with the distal end lower than the proximal end as shown in FIG. 3B, the liquid can be transferred from the well 41 in the well tab to the proximal end of the capillary. The capillary can wick the liquid, with gravity assistance, to the distal end 62 of the capillary 60. In this case, the liquid volumes may be measured from the distal end to the meniscus, instead of from the proximal end to the meniscus. In other configurations, such as multiple aliquots of liquid in the capillary, the distance between the meniscuses would determine the corresponding volume of liquid in the capillary. Regardless, suitable markings 32, e.g., included on a top surface of the cartridge, on the capillary, and/or the like, can indicate the volume of liquid using any of the measurement solutions.

Figure 9:
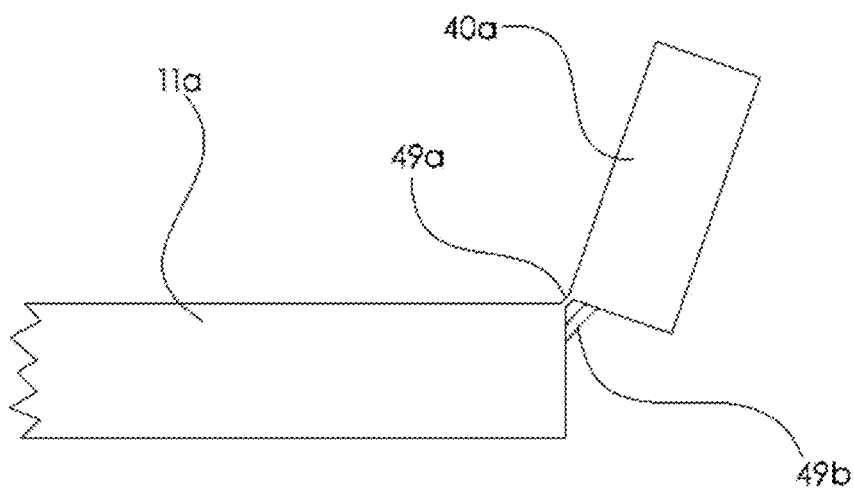
FIG. 9 shows a cartridge with a living hinge according to an embodiment.

It is understood that the cartridge body 11 and well tabs 40 are only illustrative of various embodiments. For example, pivotable wells can be connected to the cartridge body using any of various alternative configurations. To this extent, FIG. 9 shows an embodiment in which the well tabs 40a are connected to the cartridge body 11a by a thin web or living hinge 49a according to an embodiment. In this case, the well tab 40a and the cartridge body 11a are a single part, attached to each other by a living hinge 49a. The living hinge 49a can include one or more features configured to encourage the well tab 40a to be in a vertical position. For example, the living hinge 49a can a have a curved shape or tension ribs 49b or other feature so that it is bistable, with two preferred positions, either horizontal or near vertical, which encourages proper operation of the wells as described herein.

Additionally, embodiments of a cartridge described herein can use any of various alternative configurations for locating/positioning and securing/affixing one or more capillaries to the cartridge body. Such configurations can include any combination of various solutions, including mechanical, tape, adhesive, spring tabs, and/or the like. To this extent, FIGS. 10A-10D show alternative configurations for positioning and holding a capillary according to embodiments.

Figure 10A:
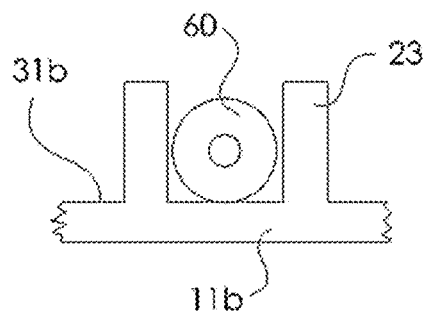
FIGS. 10A-10D show alternative configurations for positioning and holding a capillary according to embodiments.
Figure 10B:
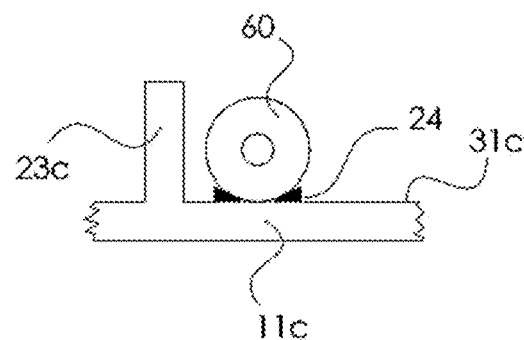
Figure 10C:
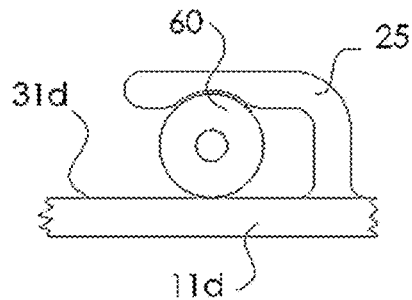
Figure 10D:
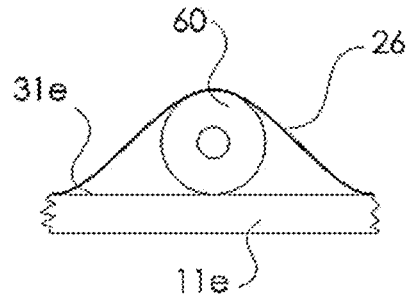

For example, FIG. 10A shows protrusions 23 protruding from a top surface 31b of a cartridge body 11b, which extend above the capillary 60 and are separated by a distance slightly greater than the diameter of the capillary. The protrusions 23 can provide protection and also align the capillary. In another embodiment, FIG. 10B shows a capillary 60 adhered to a top surface 31c of the cartridge body 11c and a protrusion 23c that is near, but not immediately adjacent to, the capillary 60. The protrusion 23c extends far enough above the top surface of the cartridge body and capillary, that a flat or blunt object cannot contact the capillary. As a result, the protrusion 23c provides protection but does not define the position of the capillary. Adhesive 24 bonds the capillary to the cartridge body. FIG. 10C shows a spring tab 25 extending from the top surface 31d of the cartridge body 11d, capturing a capillary 60, in a desired position. The spring tab 25 secures the capillary to the cartridge body. FIG. 10D shows a piece of tape 26 securing a capillary 60 to the top surface 31e of the cartridge body 11e. The tape 26 secures the capillary to the cartridge body.

In an embodiment, use of any of the positioning and holding approaches shown in FIGS. 10A-10D can be combined with use of a groove 13 (FIG. 1) and/or one or more of the other positioning and holding approaches shown in FIGS. 10-10D. For example, a top surface of the cartridge body can include one or more protrusions adjacent to a groove 13. In each case, the groove 13 can be made shallower, but still provide the centering functionality described herein. While the protrusions are shown having a particular shape, it is understood that this is only illustrative, and embodiments of the protrusions can have any shape.

Figure 11A:
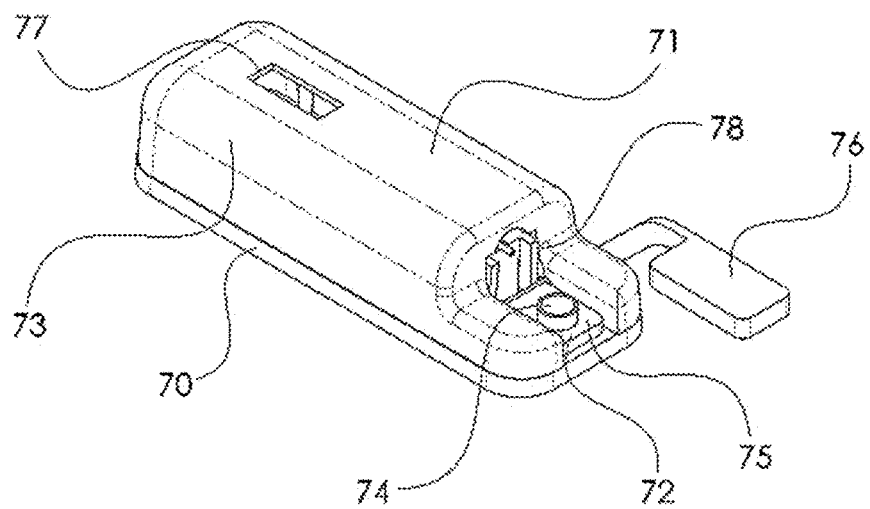
FIGS. 11A and 11B show an illustrative cartridge according to another embodiment.
Figure 11B:
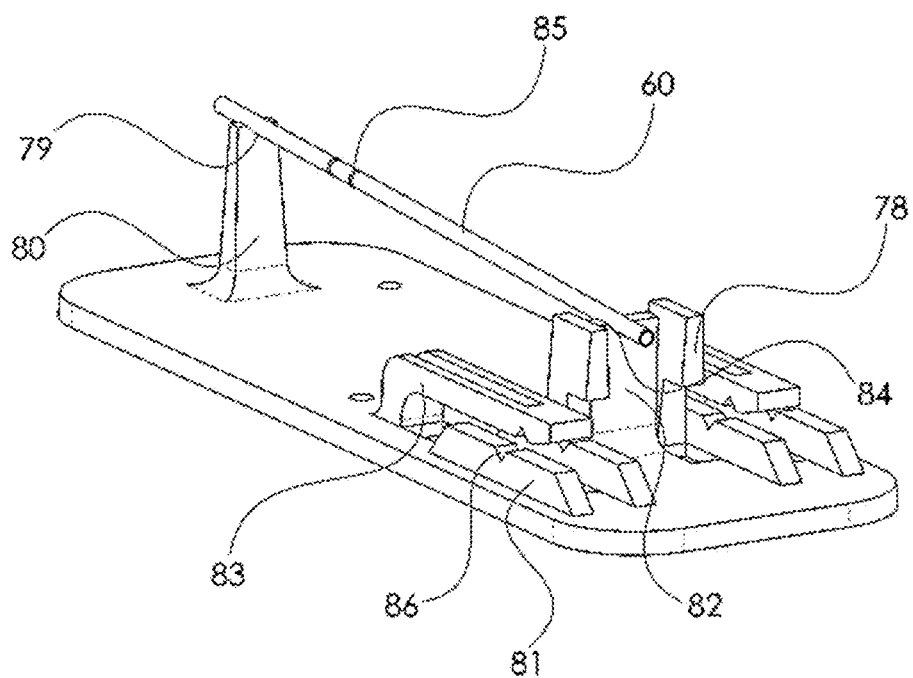

Embodiments of a cartridge described herein can include any number of capillaries and any of various configurations for enabling a well to be pivoted to an end of a capillary. For example, FIGS. 11A and 11B show an illustrative cartridge 73 according to another embodiment. In this case, the cartridge 73 is composed of three main parts, including a cover 71, a base 70 and a pivot well assembly 72. The pivot well assembly 72 includes a well 74 on a tab 75, which is connected by an axle to a handle 76. The handle 76 of the pivot well assembly 72 enables a user to move the well 74 to the proximity of the proximal end of the capillary 60. The cover 71 can include a viewing window 77, which enables a user to view a relevant portion of a capillary included therein. For example, the window 77 can allow the user to view whether the meniscus is between the bands 85 on the capillary. A mechanical stop 78 can be configured to contact the tab 75 when the pivot well assembly is upright, thereby limiting the rotational travel of the pivot well assembly.

FIG. 11B shows the base and pivot well assembly in more detail. A capillary 60 rests in a groove 79 on a pedestal 80 and on a groove 84 in the top surface of a wall 82. In an embodiment, one or both grooves 79, 84 can comprise V-grooves as described herein. Spring arms 83 and a groove 86 in a rib 81 in the base define the position and retain the axle of the pivot well assembly. Markings, bands, or graduations 85 can be included on the capillary 60 to facilitate measurement of a volume of fluid as described herein.

Figure 12:
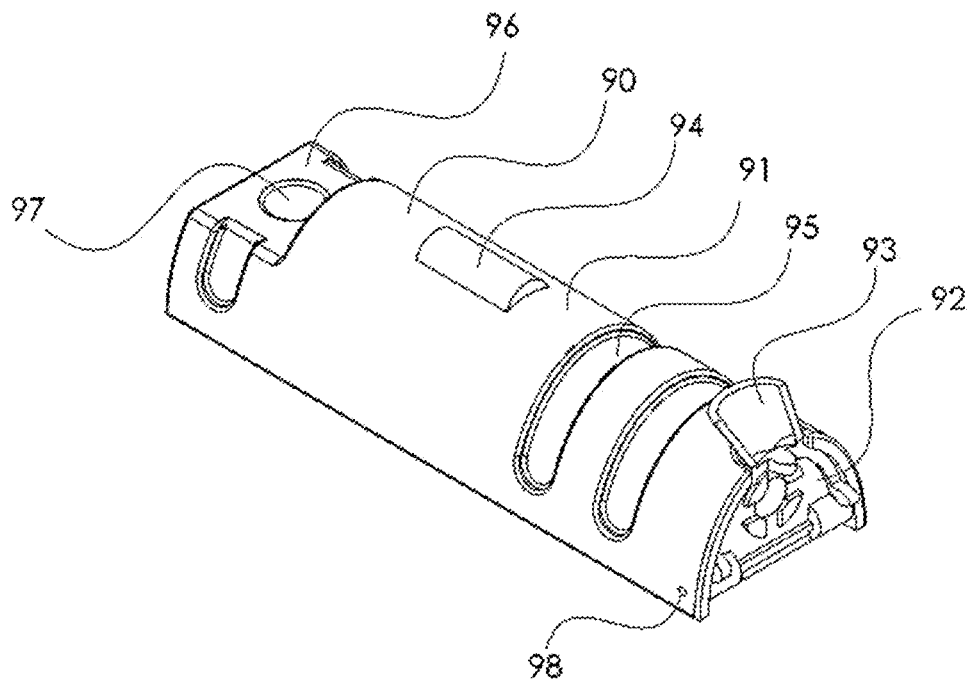
FIG. 12 shows an illustrative cartridge according to still another embodiment.

A cartridge described herein can include one or more features to make use of the cartridge easier for a user. For example, FIG. 12 shows an illustrative cartridge 90 according to still another embodiment. The cartridge 90 includes a cover 91, a pivot well assembly 92 with a finger tab 93, a lens 94 in the cover, recesses 95 in the cover, a flat region 96 and a reservoir 97. The axle of the pivot well assembly can be held in place by axle holes 98 in the cover. The recesses 95 in the cover 91 can function as locations for labels as well as ergonomic finger grips. The flat region 96 can provide a surface for a seal to seal in a dye in the reservoir 97. The finger tab 93 can provide an ergonomic mechanism for the user to rotate the pivot well assembly 92. The ends of the axle of the pivot well assembly can be configured to fit in the axle holes 98 in the cover. For example, the axle ends can snap fit into the axle holes. A lens 94 can be configured to magnify a region of the capillary where the position of the meniscus is to be evaluated.

Figure 13A:
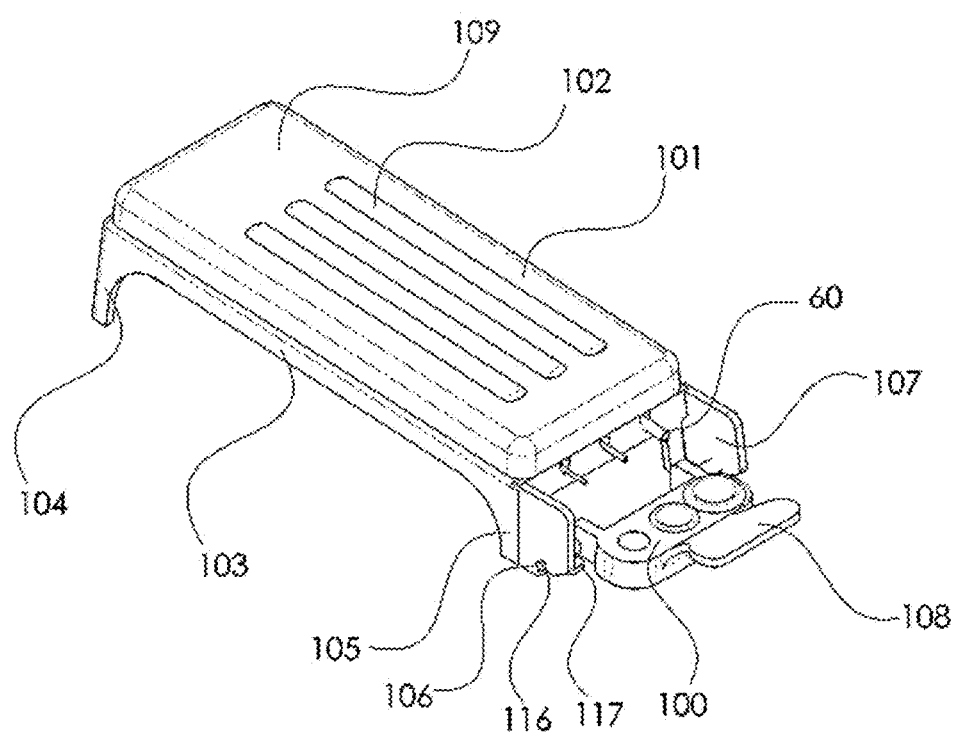
FIGS. 13A and 13B show another illustrative cartridge and a corresponding pivot well assembly according to an embodiment.
Figure 13B:
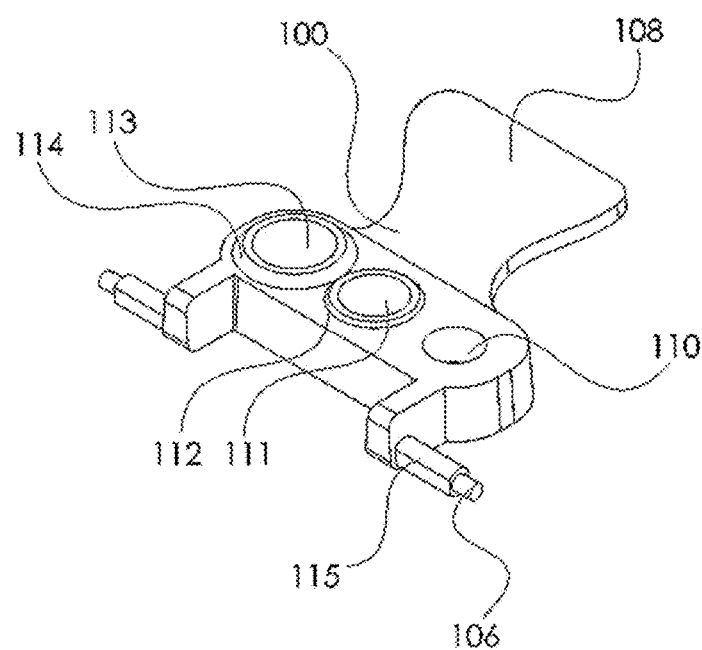

FIGS. 13A and 13B show another illustrative cartridge 109 and a corresponding pivot well assembly 100 according to an embodiment. The cartridge 109 includes a pivot well assembly 100, a cover 101 with separate integrated lenses 102, each of which is oriented substantially parallel to a corresponding capillary 60, and a base 103. Each lens 102 can extend for a significant portion (e.g., more than fifty percent) of the length of the corresponding capillary 60. The lenses 102 assist the user to see the liquid (e.g., dye) and meniscuses in the corresponding capillaries 60. The rear feet 104 can be longer than the front feet 105 to cause the capillaries 60 to rest at an incline.

A guard tab 107 extends from the base and includes a slot or groove 116. The axle 106 (shown in FIG. 13B) of the pivot well assembly 100 rests in the slot or groove 116 of the guard tab 107, which retains the axle 106 along with a spring tab 117 located below the cam 115 on the axle 106. In particular, the axle 106 of the pivot well assembly 100 can be captured in slots 116 and the spring tabs 117 of the guard tabs 107 extending from the base 103. The guard tab 107 can act as a guard to protect the proximal ends of the capillaries 60. A finger tab 108 extends from the pivot well assembly 100.

The individual wells can be of different geometries, enabling optimization for different volumes or types of liquids. The corresponding capillaries 60 can likewise be of different sizes, corresponding to the desired volumes to be dispensed into the wells in the well tab(s). As shown in more detail in FIG. 13B, the pivot well assembly 100 can include three wells 110, 111, 113, each having a different size from the other wells, attached to a single well tab. In applications in which evaporation does not cause significant measurement errors, such as in a humid environment or with larger volumes of liquid, the wells can be attached as illustrated. However, for applications in which the liquid in the wells must be transferred rapidly to the capillaries to minimize evaporation losses, then the wells should be on separate well tabs.

Additionally, a large mound or ring 114 can be located around the largest well 113 and a medium size ring 112 can be located around the medium size well 111. The rings 112, 114 can assist a user with identifying the well 113 to receive the largest volume of liquid and the well 110 to receive the smallest volume of liquid. The axle 106 can contain a cam 115. The spring tab 117 can act on the cam 115 to help retain the pivot well assembly in a vertical position. The finger tab 108 can be aesthetically and/or ergonomically contoured, and extend outward and upward to allow enough clearance for a portion of a finger to fit underneath.

Figure 14A:
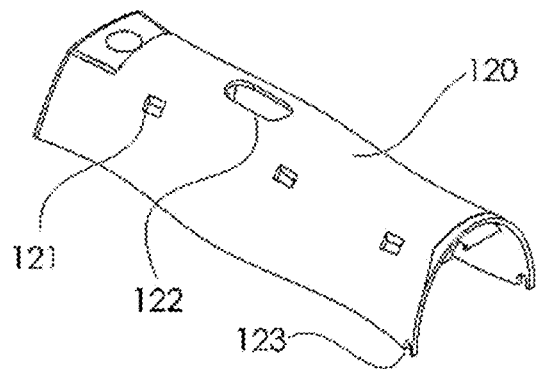
FIGS. 14A-14D show components of another illustrative cartridge according to an embodiment.
Figure 14B:
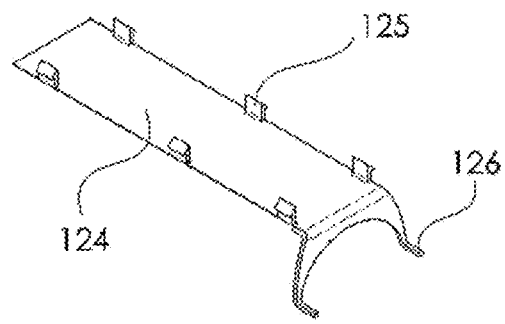
Figure 14C:
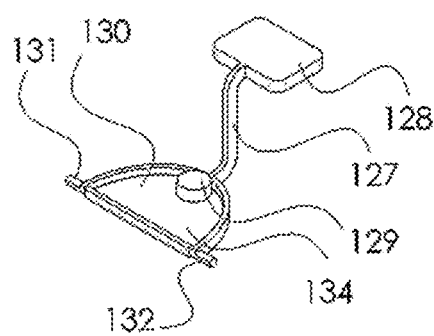
Figure 14D:
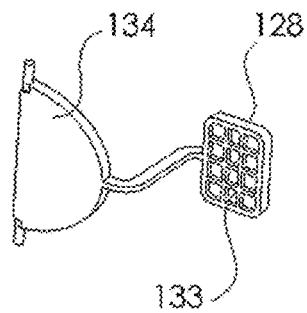

FIGS. 14A-14D show components of another illustrative cartridge according to an embodiment. In particular, FIG. 14A shows a cover 120 which has a contoured ergonomic shape, and slots 121, a window 122, and axle slots 123. FIG. 14B shows a base 124, which includes spring tabs 125 and spring arms 126. FIGS. 14C and 14D show a top and underside view, respectively, of a pivot well assembly 134. As illustrated, the pivot well assembly 134 contains a handle arm 127 that connects a platform 130 with a finger grip handle 128. A well 129 is located on the platform 130. The platform 130 has an axle 131, which includes a flat 132. As shown in FIG. 14D, the finger grip handle 128 can have a textured bottom surface 133.

In this embodiment, the spring tabs 125 and spring arms 126 hold the components together. For example, the components can be snapped together. The spring arms 126 which extend from the base 124 can capture the axle 131 in the axle slots 123 in the cover 120, and the spring tabs 125 lock the cover 120 onto the base 124. The cover 120 can have an ergonomically curved surface that gets narrower and wider along the length, so that the user's fingers can better grip the cover 120. The pivot well assembly 134 includes the finger grip handle 128 at the end of the handle arm 127. The finger grip handle 128 can be located higher above the work surface, thereby making it is easy for a user to place a finger below the finger grip handle 128. The textured surface 133 can make the finger grip handle 128 easier to grip.

Figure 15:
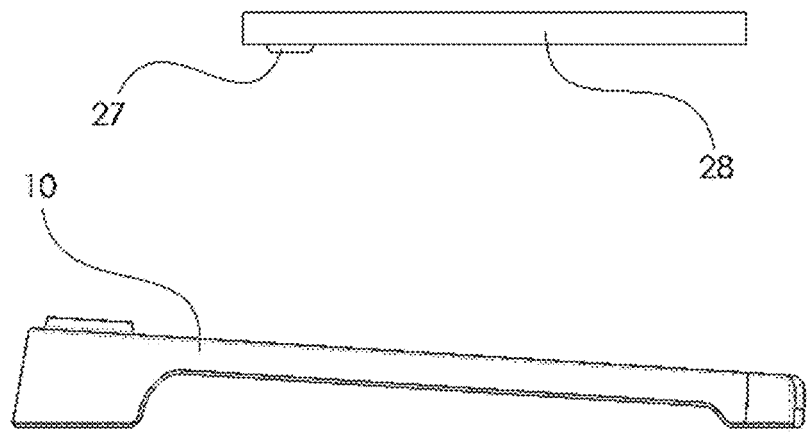
FIG. 15 shows an illustrative system in which a camera is positioned above a cartridge according to an embodiment.

It is understood that a cartridge described herein can be integrated with and/or utilized in conjunction with other components. For example, a system can include a cartridge described herein and an imaging device, which can be used to record an image of the measurement(s) performed using the cartridge. To this extent, FIG. 15 shows an illustrative system in which a camera 27 of a smartphone 28 is positioned above a cartridge 10 according to an embodiment. While shown in conjunction with the cartridge 10 shown in FIG. 1, it is understood that a camera 27 can be utilized in conjunction with any of the cartridges described herein. Similarly, while the camera 27 is shown included on a smartphone 28, it is understood that any type of imaging device can be utilized.

In an embodiment, the smartphone 28 includes program code (e.g., an app), which enables the smartphone 28 to photographically record various data regarding the measurement. Such data can include, for example, position(s) of the liquid (e.g., dye) in the capillary(ies) of the cartridge, a cartridge ID, a time and date of the measurement, and/or the like. Additionally, the smartphone 28 can include program code, which enables the smartphone 28 to evaluate and record the readings and/or enables the user to indicate other pertinent information. To this extent, the smartphone 28 can be configured (via the app or a second app) to perform image processing to identify reference markings on the cartridge and/or capillary to evaluate the measurement. Additionally, the smartphone 28 can perform image processing to extract additional data from the image, such as identification information of the cartridge.

Similarly, the smartphone 28 can be configured to acquire and extract other information pertinent to the measurement. For example, the smartphone 28 can acquire an image of a pipette being evaluated, and process the image data to acquire data regarding the pipette, such as an identifier (e.g., as represented by a barcode), a type of pipette tip, and/or the like. Other data can include a name or identification of the user, ambient temperature, humidity, location information, and/or other ambient conditions. In an embodiment, the smartphone 28 can be configured to present a user with a series of instructions for providing the data for the measurement and performing the measurement. Regardless, it is understood that some or all of the data regarding the measurement can be input by a user. The smartphone 28 can be configured (e.g., via an app) to provide a history of these measurements by any or all of these parameters. The history can be presented as text or graphically.

Figure 16:
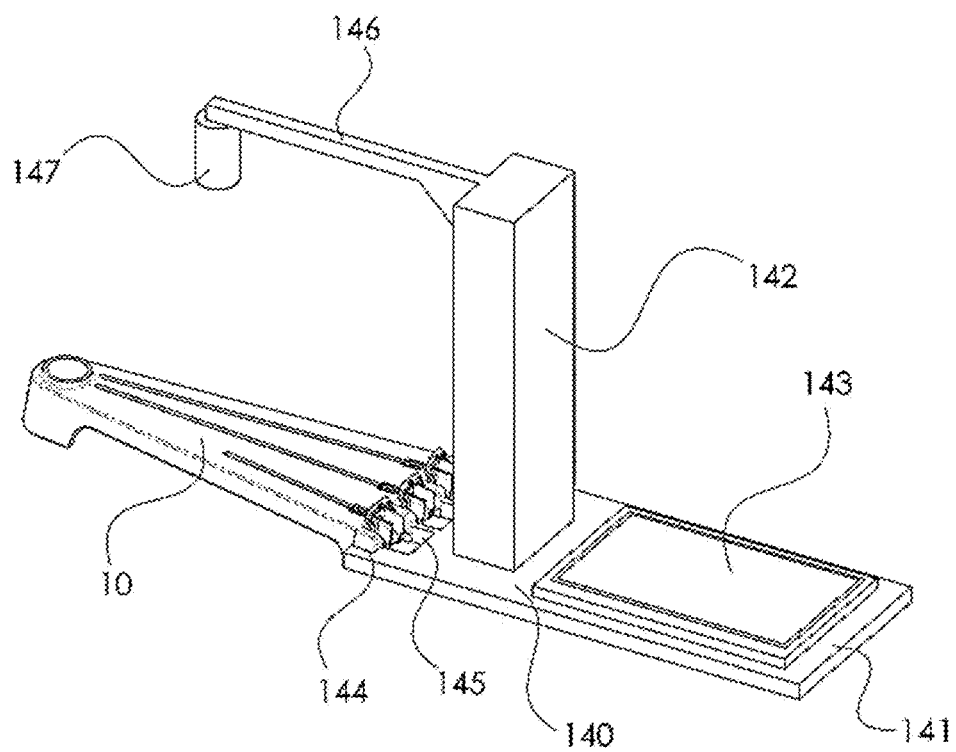
FIG. 16 shows an illustrative system including a cartridge and a docking station for photographically recording measurement results according to an embodiment.

A system described herein can include one or more components to assist in reliably and consistently acquiring image data of evaluations. To this extent, FIG. 16 shows an illustrative system including a cartridge 10 and a docking station 140 for photographically recording measurement results according to an embodiment. The docking station 140 can include a camera 147 located at the end of an arm or beam 146, which is attached to a post 142, which is mounted to a base 141. A touch screen or other type of control panel 143, can be located on the base 141. Side guides 144 and end guides or vanes or end stops 145 can extend from the front side of the base 141.

In this case, the system includes a dedicated holder or docking station 140 with an integrated camera 147 and control panel 143. The camera 147 and control panel 143 can be connected to a computer or dedicated instrument that performs the same functions as the smartphone and app(s) described herein. Alternatively, the camera 147 could be a smartphone, as shown in FIG. 15, in which case the smartphone can have an app as described above. Power and data connections can be incorporated in the docking station 140. The side guides 144 and end guides 145 can be end stops, configured to enable the user to accurately locate the cartridge 10 under the camera 147.

While illustrative embodiments shown herein include one or three wells and corresponding capillaries, it is understood that embodiments can include any number of one or more wells and capillaries. For example, an embodiment can comprise a cartridge with eight capillaries, perhaps on 9 mm spacing, which could be used as part of a process to evaluate the dispensing of liquid from an 8 channel pipettor.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For instance, the cartridge could be composed of only one or two capillaries, or more capillaries than as described. The cartridge may not include a reservoir, or it may include multiple reservoirs. Additionally, it is understood that features shown only in conjunction with some of the various pivot tabs and cartridges (e.g., cartridge body, base/cover, and/or the like) described herein can be combined with features from other embodiments. To this extent, each illustrated embodiment is understood to illustrate various features, which can be implemented in any combination, and not just in conjunction with a particular combination shown herein. The invention should therefore not be limited by the above described embodiments, methods, and examples, but by all embodiments and methods within the scope and spirit of the invention.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A device comprising:
    a capillary;
    a cartridge body having a surface including means for positioning and affixing the capillary directly on the surface such that a proximal end of the capillary is located adjacent to a first end of the cartridge body, wherein the means for positioning and affixing includes an attachment region located on the surface bordered by two slots in the surface, wherein at least one of: the surface of the cartridge body or a protrusion located on the surface of the cartridge body extends above the capillary, and wherein the surface includes means for measuring a volume of fluid located within the capillary;
    a well tab, wherein the well tab includes a well for holding the volume of fluid;
    means for pivotally mounting the well tab to the first end of the cartridge body, wherein the means for pivotally mounting enables the well to have a substantially horizontal orientation and a substantially vertical orientation, and wherein the well is located adjacent to an end of one of the capillary when the well tab is in the substantially vertical orientation to allow liquid in the well to wick into the capillary.

2. The device of claim 1, wherein the means for positioning and affixing includes a groove in the surface, wherein the groove extends to the first end of the cartridge body.

3. The device of claim 1, further comprising a reservoir located at an opposing second end of the cartridge body and means for sealing the reservoir, wherein the reservoir includes a colored liquid, and wherein a surface of the means for positioning and affixing has a color configured to provide a background for viewing the colored liquid in the capillary.

4. The device of claim 1, further comprising at least two additional capillaries and corresponding wells, wherein the first end of the cartridge body is wider than an opposing second end of the cartridge body.

5. The device of claim 4, wherein the device includes a plurality of well tabs, each well tab including only one well.

6. The device of claim 1, wherein a surface forming a bottom of the well includes a secondary well.

7. The device of claim 1, wherein the means for pivotally mounting includes means for stabilizing the well tab in the substantially vertical orientation.

8. The device of claim 1, wherein the means for pivotally mounting includes:
    an axle mounted to the cartridge body in an orientation substantially perpendicular to an orientation of one of the at least one capillary;
    a pair of cams located on opposing sides of the axle;
    a pivot block located on the well tab, wherein the pivot block is configured to contact a central region of the axle on a first side; and
    a pair of flexible arms located on opposing sides of the well tab, wherein each flexible arm is configured to contact a cam of the pair of cams on a second side opposite the first side.

9. The device of claim 8, wherein the pair of cams are shaped to stabilize the well tab in the substantially vertical orientation.

10. The device of claim 9, wherein at least one of the pair of flexible arms includes a rounded section protruding from a bottom surface in contact with at least one of the pair of cams, and wherein the at least one of the pair of cams includes a dent configured to fit the rounded section of the at least one of the pair of flexible arms when the well tab is in the substantially vertical orientation.

11. The device of claim 1, wherein the means for pivotally mounting includes a living hinge.

12. The device of claim 11, wherein the living hinge includes means for stabilizing the well tab in the substantially vertical orientation.

13. The device of claim 1, wherein the well tab includes a finger tab configured to extend away from the cartridge body, wherein the finger tab is contoured and extends upward to assist a user in pivoting the well tab.

14. The device of claim 1, wherein the attachment region includes at least one recess.

15. A measurement system comprising:
    a cartridge body;
    a reservoir located at a first end of the cartridge body, wherein the reservoir includes a colored liquid;
    means for sealing the reservoir;
    a capillary mounted directly on a surface of the cartridge body, wherein at least one of: the surface of the cartridge body or a protrusion located on the surface of the cartridge body extends above the capillary, and wherein the surface includes means for measuring a volume of fluid located within the capillary;
    a well tab, wherein the well tab includes only one well for holding a volume of fluid, wherein the cartridge body has a color near the capillary configured to provide a background for viewing the colored liquid in the capillary;
    means for pivotally mounting the well tab to the cartridge body, wherein the means for pivotally mounting enables the well tab to have a substantially horizontal orientation and a substantially vertical orientation, wherein the means for pivotally mounting includes means for stabilizing the well tab in the substantially vertical orientation, and wherein the well is located adjacent to an end of the capillary when the well tab is in the substantially vertical orientation to allow liquid in the well to wick into the capillary.

16. The system of claim 15, further comprising means for acquiring image data of the capillary and the surface.

17. The system of claim 16, wherein the means for acquiring comprises a camera on a smartphone, and wherein the smartphone includes program code for managing data corresponding to a measurement performed by the system.

18. The system of claim 16, wherein the means for acquiring comprises a docking station, wherein the docking station includes means for aligning a camera and the capillary.

19. A measurement system comprising:
a cartridge body having a first end wider than a second end located opposite the first end;
a plurality of capillaries positioned directly on a surface of the cartridge body, each of the plurality of capillaries having an end located at the first end of the cartridge body, wherein the surface of the cartridge body includes, for each of the plurality of capillaries, an attachment region located on the surface bordered by two slots in the surface, wherein at least one of: the surface of the cartridge body or a protrusion located on the surface of the cartridge body extends above each of the plurality of capillaries, and wherein the surface includes means for measuring a volume of fluid located within the capillary;
a set of well tabs including a plurality of wells, wherein each of the plurality of wells is aligned with one of the plurality of capillaries, wherein each of the plurality of wells is configured to hold a unique volume of fluid; and
means for pivotally mounting the set of well tabs to the cartridge body, wherein the means for pivotally mounting each well tab in the set of well tabs allows at least one of the plurality of wells to be pivoted between a substantially horizontal orientation and a substantially vertical orientation, wherein the at least one of the plurality of wells is located adjacent to an end of one of the plurality of capillaries in the substantially vertical orientation to allow liquid in the well to wick into the capillary.

20. The system of claim 19, further comprising means for acquiring and processing image data of the plurality of capillaries to measure the volume of fluid in each of the plurality of capillaries.

* * * * *

UNITED STATES PATENT AND TRADEMARK OFFICE
CERTIFICATE OF CORRECTION

PATENT NO. : 10,948,335 B2
APPLICATION NO. : 16/146021
DATED : March 16, 2021
INVENTOR(S) : Ian K. Glasgow, Jiangbo Tang and Cailee Dean It is certified that error appears in the above-identified patent and that said Letters Patent is hereby corrected as shown below:

In the Claims

At Column 11, Line 59, Claim 1, "end of one of the capillary" should be changed to "end of the capillary".

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*